United States Patent [19]

Hiroi et al.

[11] Patent Number: 4,698,745
[45] Date of Patent: Oct. 6, 1987

[54] PROCESS CONTROL APPARATUS FOR OPTIMAL ADAPTATION TO A DISTURBANCE

[75] Inventors: Kazuo Hiroi, Hachiouji; Kojiro Ito, Machida, both of Japan

[73] Assignee: Kabushiki Kaisha Toshiba, Kawasaki, Japan

[21] Appl. No.: 699,087

[22] Filed: Feb. 7, 1985

[30] Foreign Application Priority Data

Feb. 7, 1984 [JP] Japan .................................. 59-19335
Jul. 9, 1984 [JP] Japan ................................ 59-140622

[51] Int. Cl.$^4$ ....................... G05B 13/02; G06F 15/46
[52] U.S. Cl. ................................... 364/165; 364/149; 364/157; 364/158
[58] Field of Search ............... 364/149, 157, 158, 159, 364/162, 164, 165

[56] References Cited

U.S. PATENT DOCUMENTS

| | | | |
|---|---|---|---|
| 3,758,762 | 9/1973 | Littman et al. | 364/157 |
| 4,319,320 | 3/1982 | Sato et al. | 364/165 |
| 4,349,896 | 9/1982 | Prett et al. | 364/153 |
| 4,482,973 | 11/1984 | Unagami et al. | 364/165 |
| 4,489,376 | 12/1984 | Putnam | 364/165 |
| 4,533,991 | 8/1985 | Georgio | 364/164 |
| 4,563,735 | 1/1986 | Hiroi et al. | 364/165 |

OTHER PUBLICATIONS

P. A. Cook, et al., "Robustness Properties of Model-Reference Adaptive Control Systems", 8049 I.E.E., vol. 129, No. 6, (11/82).

Primary Examiner—Jerry Smith
Assistant Examiner—John R. Lastova
Attorney, Agent, or Firm—Schwartz, Jeffery, Schwaab, Mack, Blumenthal & Evans

[57] ABSTRACT

A process control apparatus according to the present invention comprises a feed back control system for outputting a feedback control signal which is computed by comparing and adjusting a set value and a process variable, and a feedforward control system for outputting a disturbance compensation signal by detecting and compensating for the disturbance based on a feedforward control model. The gain of the feedback control signal is corrected in response to the magnitude of the disturbance variations by a gain scheduling unit, and the gain of the feedforward control model is controlled by supplying a correction signal which compares and equalizes, at a feedforward control model gain adaptive unit, the disturbance compensation signal and the manipulated variable obtained by adding the disturbance compensation signal and the feedback signal that is gain-corrected by the gain scheduling unit. The feedforward control model comprises a gain memory for memorizing storing the FF model gain correction signal from the feedforward control model gain adaptive unit and an operational means for receiving a correction signal from the gain memory and a disturbance signal to compute and output a disturbance compensation signal. The process control apparatus further includes a FF model gain adaptive mechanism for controlling the supply to the gain memory of the FF model gain correction signal by confirming that the process is in a steady state, and for controlling as well the additive synthesis of the disturbance compensation signal to the feedback control signal when the difference between the disturbance compensation signal and the manipulated quantity exceeds a prescribed value.

17 Claims, 38 Drawing Figures

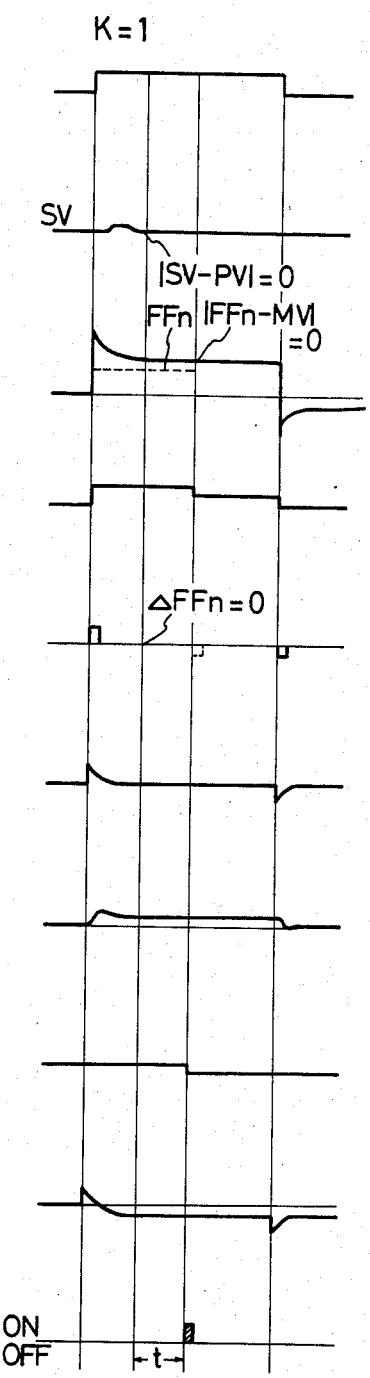

FIG. 6a DISTURBANCE D

FIG. 6b PROCESS VARIABLE PV

FIG. 6c MANIPULATED VARIABLE MV

FIG. 6d FF QUANTITY (STATIC COMPONENT) FFn (POSITION TYPE)

FIG. 6e FF QUANTITY (STATIC COMPONENT) △FFn VELOCITY TYPE

FIG. 6f FF QUANTITY (DYNAMIC COMPONENT) En

FIG. 6g FB QUANTITY FBn

FIG. 6h FF COEFFICIENT (IN THE K MEMORY)

FIG. 6i FF COEFFICIENT (COMPUTED VALUE)

FIG. 6j FULFILLMENT OF THE CONDITIONS FOR RENEWAL OF Kn

| | | |
|---|---|---|
| FIG. 7a | DISTURBANCE D | |
| FIG. 7b | PROCESS VARIABLE PV | |
| FIG. 7c | MANIPULATED VARIABLE MV | |
| FIG. 7d | FF QUANTITY (DYNAMIC COMPONENT) FFn (POSITION TYPE) | |
| FIG. 7e | FF QUANTITY (STATIC COMPONENT) $\triangle$FFn POSITION TYPE | |
| FIG. 7f | FF QUANTITY (DYNAMIC COMPONENT) En | |
| FIG. 7g | FB QUANTITY FBn | |
| FIG. 7h | FF COEEFICIENT (IN THE K MEMORY) | |
| FIG. 7i | FF COEFFICIENT (COMPUTED VALUE) | |
| FIG. 7j | FULFILLMENT OF THE CONDITIONS FOR RENEWAL OF Kn | |

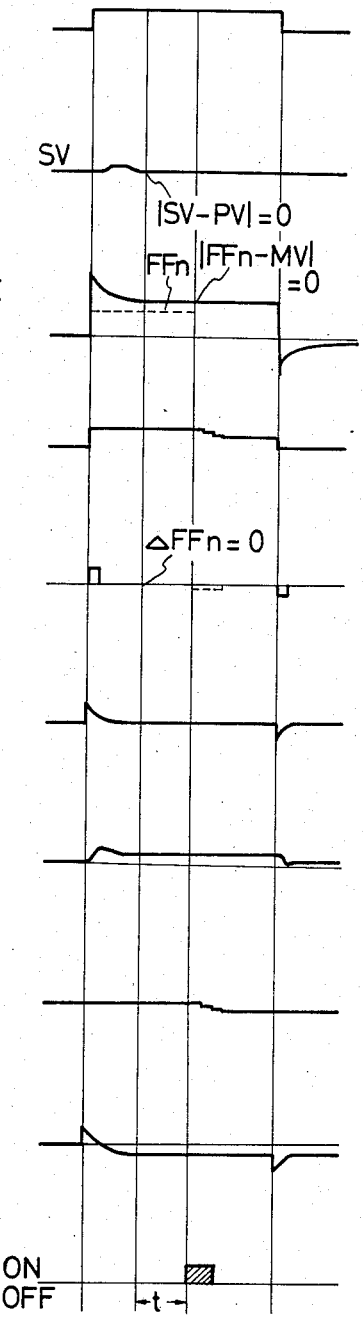

PROCESS CONTROL APPARATUS FOR OPTIMAL ADAPTATION TO A DISTURBANCE

BACKGROUND OF THE INVENTION

1. Field of the Invention

The present invention relates to a method and an apparatus for the process control which combines a feedback control and a feedforward control.

2. Description of the Prior Art

In the field of process control, demand has been increasing in recent years for an adaptive control method which is capable of adapting itself to the changes in disturbances, such as the variations in the load, environment, and the like, by responding to them in a flexible manner.

Such an adaptive control method requires as its fundamental conditions that it (1) can minimize the variations in the process variable even when the disturbance is a sudden change, (2) can respond optionally to any of the variations in a dynamic characteristic of the process, and (3) has a simple and multipurpose construction.

As representative examples of the prior art adaptive control method there are known (1) the self-tuning regulator (STR) and (2) a model reference adaptive control system (MRACS). However, such a control method corrects the parameters of the regulating system based on a mathematical analysis such as a fixing method or a stabilization theory, by focusing attention on the controlled result, namely, the changes in the process variable. That is, it is based on the feedback control which works on the availability of the controlled result, so that it is affected directly by the disturbances. Because of this, it is applicable only to those processes in which the disturbances, process characteristics, and the like vary slowly with special patterns, and cannot satisfy the above three fundamental conditions for the case of ordinary processes which vary in various manners.

In addition, in order to be able to respond flexibly to the variations in the load and environment, it is proposed in the prior art process control methods to combine the feedback control (called FB control hereafter) method which is the basis of the prior art process control method and the feedforward control (called FF control hereafter) method which estimates and controls beforehand the influence, such as the load variations, due to disurbances, to improve the ability to cope with the disturbance, namely, the response speed.

In the feedforward/feedback control (called FF/FB control hereafter) which combines the feedback control and the feedforward control, the FF control detects the disturbance such as the variations in the load, estimates and controls beforehand the process while compensating for the influence due to the disturbance by the disturbance compensation signal (this becomes the output of the FF control) from the FF control model, and corrects and controls the control deviation in the result by the FB control. Namely, in the FF/FB control, the FB control outputs an adjustment control (the FB control output) to correct the deviation when there is a control deviation as a result of the FF control, and hence, the FB control function will not be needed if the FF control is achieving an ideal operation for estimation and precursory control.

In an actual FF/FB control of a process, however, it is difficult to accomplishs an ideal FF control due to (1) the errors in the FF control model, (2) changes with the passage in time and changes in the enviroment, (3) influence of the disturbance elements not yet detected, and (4) influence of other indeterminate elements, and so forth, so that support from the FB control becomes necessary.

As it is, if the degree of contribution of the FB control to the FF/FB control is increased, there arise fatal weaknesses for its practical use in the process control, such as (1) a decrease in the ability to cope with, and the controllability of, the disturbance, and (2) a marked decrease in the responsiveness to the changes in the disturbance due to incomplete FF control, and so on, for its practical use in the process control.

SUMMARY OF THE INVENTION

An object of the present invention is to provide a process control apparatus which is capable of improving the controllability to the utmost limit by restraining the changes in the process variable to a minimum for any variations in the disturbance whatsoever.

Another object of the present invention is to provide a process control apparatus which is capable of minimizing the degree of contribution of the FB control in the FF/FB control.

Another object of the present invention is to provide a process control apparatus which is capable of reliably following the variations in the disturbance and process characteristics even when they vary arbitrarily and rapidly.

Another object of the present invention is to provide a process control apparatus which is capable of responding optimally to any of the variations with the passage in time of the process.

Briefly described, these and other objects of the present invention are accomplished by the provision of an improved process control device which includes feedback control means which outputs a feedback control signal which is computed by comparing and adjusting the set value and the process variable, feedforward control means which outputs a disturbance compensation signal by detecting a disburbance and compensating for the disturbance based on the feedforward control model, gain scheduling means which corrects the gain of the feedback control signal in accordance with the magnitude of the disturbance variation, and feedforward control model gain adaptive means which corrects the gain of the feedforward control model of comparing, and outputting a correction signal to equalize, the disturbance compensation signal and the manipulated variable obtained by additively synthesizing the disturbance compensation signal and the feedback control signal that is gain-corrected by the gain scheduling means.

BRIEF DESCRIPTION OF THE DRAWING

These and other objects, features and advantages of the present invention will be more apparent from the following description of a preferred embodiment, taken in conjunction with the accompanying drawings, in which:

FIGS. 6a–j and 7a–j are the time charts for illustrating the operation of the embodiment shown in FIG. 4;

DESCRIPTION OF THE PREFERRED EMBODIMENTS

Figure 1:
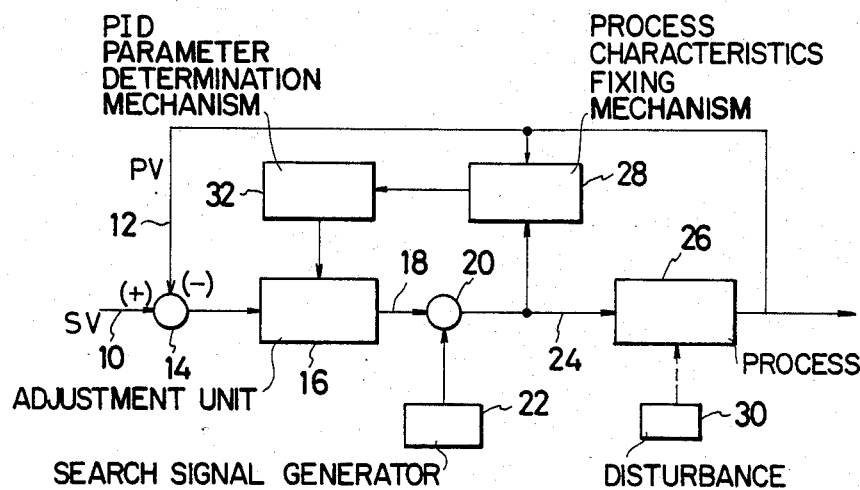
FIG. 1 is a block diagram of a process control device of the STR system in accordance with the prior art.

To facilitate the understanding of the present invention, a brief reference will be made to a prior art process control apparatus of the STR system illustrated in FIG. 1.

As shown, a set value 10 and a process variable 12 are introduced to a deviation unit 14, the deviation signal between the two values is supplied to an adjustment unit 16, where the adjustment unit 16 obtains an adjusted output signal 18 by applying the P (proportional), I (integral), and D (derivative) operations to the signal received, and outputs it to an adder 20. Further, a search signal such as an M-series signal for probing the process characteristics is supplied to the adder 20 from a search signal generator 22, and the additively synthesized signal of the search signal and the controlled output signal is output as a manipulated variable 24 to the process 26 and a process characteristics fixing mechanism 28.

On the other hand, a disturbance 30 is added to the process 26, and a process variable 12 which changes about under this influence is fed back to the deviation unit 14 and the process characteristics identification mechanism 28. At the process characteristics identification mechanism 28, an unknown parameter for the process is sequentially estimated, based on the process variable 12 and the manipulated variable 24, by the use of an appropriate fixing method, and the result is output to the PID parameter determination mechanism 32. Based on the unknown parameter, the PID parameter determination mechanism 32 determines the PID parameter which is output to the adjustment unit 16 where the parameter at the adjustment unit 16 is renewed to correct the system to an optimum control state.

An STR system with above construction has the following fatal defects as a control system for industrial application. Namely, (1) It is under direct influence of the disturbance since it is a correction of the PID parameter which is focused on the variations in the process variable 12.

(2) A new manipulated variable is obtained by fixing the process characteristics and correcting the PID parameter through observation of the controlled result of the process due to the manipulated variable which was output at the preceding sampling instant. Since the process frequently varies and moves to a new state which is different from that for the fixed value, by the time the manipulated variable is fixed to the process for the preceding sampling instant, a parameter correction turns out to be in vain, with an unexpected result that the error causes an irregularity in the control.

In the actual fixing operation, fixing is completed after confirming that the same control result is obtained for a few manipulated variables, resulting in a time lapse of about three to four times the (process+time constant) for the process. Because of this, for a practical process in which the disturbance and the process characteristics vary arbitrarily and rapidly, the system cannot follow these variations, with a result that the adaptation can hardly be accomplished.

(3) As a search signal, an M series signal or the like which has positive and negative pulse components with zero mean value that has no adverse effect on the process is applied with some expediency. However, when its amplitude is not large enough, it will be ignored by the adjusted output signal 18, whereas when it is too large, it will give an adverse effect such as a shock to a positioned signal for a controller set point or the position of the final control element, namely, an operation terminal.

(4) The theory of a fixing method is complicated so that its qualitative and quantitative relationships cannot be understood readily.

A process control apparatus in accordance with the present invention is aimed at solving these and other problems, which will be described by referring to FIGS. 2 to 8.

Figure 2:
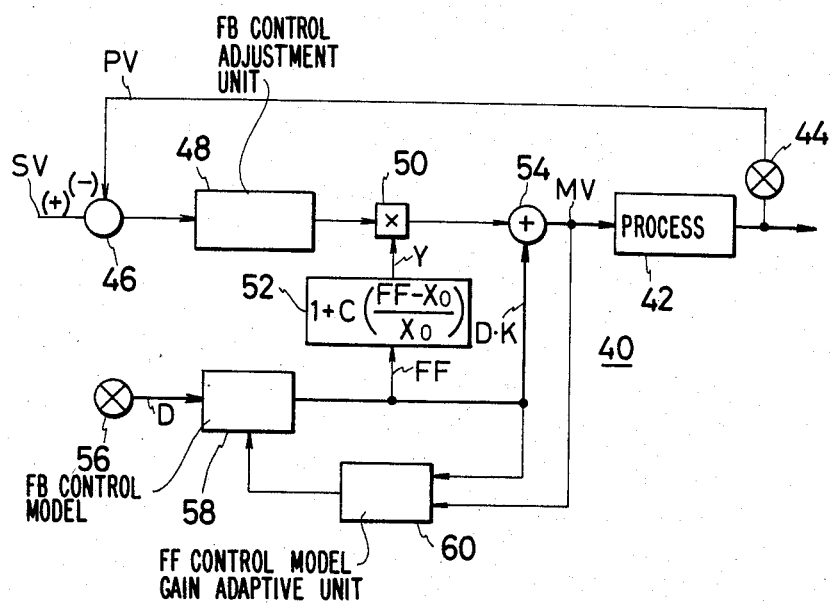
FIG. 2 is a simplified block diagram of a process control apparatus in accordance with the present invention.

Referring now to FIG. 2, a simplified construction of a process control apparatus embodying the present invention is illustrated generally by reference numeral 40. The process control apparatus 40 comprises a process 42, and a feedback control system and a feedforward control system for the process 42. In the feedback control system, a process variable such as the temperature, pressure, flow rate, level, concentration, or the like, which represents the state of the process and is output from the process 42, is detected by a process variable detector 44 as a process variable, and a process variable PV proportional to the detected amount is output to a deviation unit 46. The deviation unit 46 finds the deviation between the control signal PV and the set point variable SV, and outputs the controlled deviation signal to an FB control adjustment unit 48. The FB control adjustment unit 48 exercises a PID or I-PD control or the like on the control deviation signal to output an FB control output signal to a multiplier 50. The multiplier 50 multiplies the FB control output signal with a gain correction signal which is output from a gain scheduling unit 52, in order to output an FB control output signal that is gain-corrected in response to the magnitude of the disturbance variation, to an adder 54. The adder 54 adds the gain-corrected FB control output signal to a disturbance compensation signal D.K which is supplied by a feedforward control system, to obtain a manipulated variable MV which is outputted to the process 42.

Next, the FF control system will be described. The disturbance D, such as the load variation, environmental change, or the like which is being applied to the process 42, is detected by a disturbance detector 56, and is output to an FF control model 58 as a disturbance signal D proportional to it. In general, an FF control model might attempt to achieve a static compensation alone due to a set gain K, or a static compensation combined with a dynamic compensation that compensates for the influence of a sudden change in the disturbance through its transfer function. To facilitate the explanation, description will be given in this embodiment using the former case, but it will of course be applicable also to the static compensation portion of the latter case.

The FF control model 58 multiplies the disturbance signal D with a static compensation gain K to obtain a disturbance compensation signal D.K which is output respectively to the adder 54, the gain scheduling unit 52, and an FF control model gain adaptive unit 60.

The gain scheduling unit 52 corrects the FB control output signal gain in accordance with the magnitude of the disturbance variations. For example, when the process load increases, the irregularity due to insufficient or excessive output of the FB control output signal is resolved beforehand to attain a stabilization of the control at an early time, by increasing beforehand the FB control output signal gain by the use of a gain correction signal which relates the disburbance compensation signal D.K that was detected beforehand and an optimized coupling coefficient that is suited to the process variable. A piecewise linear function for the gain scheduling can be expressed analytically. The gain scheduling unit 52 for this embodiment has a function as represented by the following expression.

$$Y = 1 + C\left(\frac{FF - Xo}{Xo}\right)$$

In the above equation, FF is the input signal to the gain scheduling unit 52, namely, the disturbance compensation signal D.K, Y is its output signal, namely, the gain correction signal, C is the coupling coefficient between the FF control and the FB control, and Xo is the magnitude of the disturbance compensation signal at the time of determination of the PID parameter for the FB control adjustment unit 48.

This expression has a construction which is applicable to all kinds of processes by setting and renewing the coupling coefficient C in accordance with the content of the process variable, and others. Namely, (1) When $C=0$, $Y=1.0$ which represents a combined control of an FB control and an FF control without executing the gain correction for the FB control output signal.

(2) When $C=1.0$, $Y=FF/Xo$, which executes a gain correction for the FB control output signal in proportion to the magnitude of the FF control output. The process quantities which can be the object of this case are the temperature and the concentration of a mixing process, and an optimum coupling of these controls becomes possible.

(3) When $0<C<1$, $$Y = 1 + C\left(\frac{FF - Xo}{Xo}\right) = C\frac{FF}{Xo} + (1 - C)$$

which shows that the rate of gain correction for the FB control output signal can be varied by the value of C, making it possible to attain an optimum gain correction in accordance with the process. The process quantities that can become the object of this case are the pressure, flow rate, level, and others for a nonmixing process.

Since the gain of the FB control output signal can be corrected beforehand in this manner in accordance with the variations in the process, a manipulated variable which is suited for the process after the correction can be output, making it possible to attain a control that follows the process variations.

Furthermore, the FF control model gain adaptive unit 60 resolves (1) the estimated errors and, (2) the influence of the unknown disturbances, and others that cannot be taken care of by the FF control and the gain scheduling. Here, the FF control in accordance with the errors and the influence is attained by grasping the inaccuracy in the FF control caused by these errors and the influence as an increase in the FB control output signal, and by correcting the FF control model so as to have a vanishing FB control output signal. Namely, the FF control model gain adaptive unit 60 receives the disturbance compensation signal D.K which is the output signal of the FF control model, and the manipulated variable MV which is the synthesized signal of the FB control output and the FF control output, and computes a corrected value of the FF control model which equalizes these two signals. The corrected value is output to the FF control model 58 to correct its gain automatically.

Figure 4:
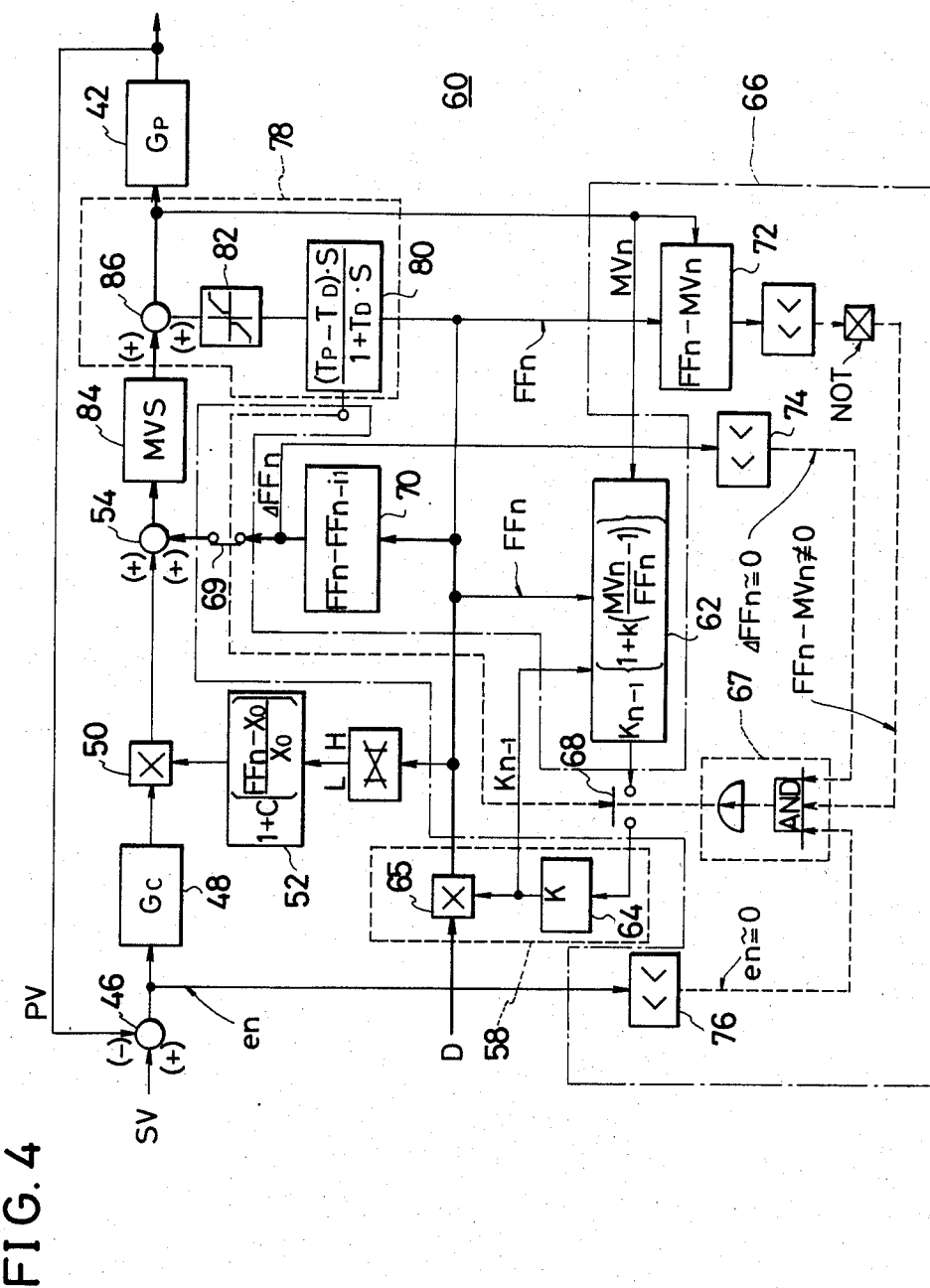
FIG. 4 is a concrete block diagram of the process control apparatus shown in FIG. 2.

The correction of the model gain may be accomplished either by a construction which executes the correction continuously in response to the process characteristics or by a periodic operation in response to the environment changes. In the latter case, the correction can be attained by arranging a construction which executes the correction operation by the output from a timer circuit which is installed in the FF control model gain adaptive unit 60. Also, as shown in FIG. 4, the gain correction of the FF control model may be accomplished by installing a level detector in the FF control output signal or the manipulated variable and by executing the correction when the level exceeds a prescribed value and the system is found to be stable for that value.

In this way, by correcting the FF control model so as to bring to zero the FB control output signal that appears as a result of the above mentioned errors and the influence, it becomes possible to optimize the estimated control for the portion that cannot be eliminated even by the FF control and the gain scheduling. Next, the operation of the present embodiment will be described by referring to FIG. 3.

Figure 3:
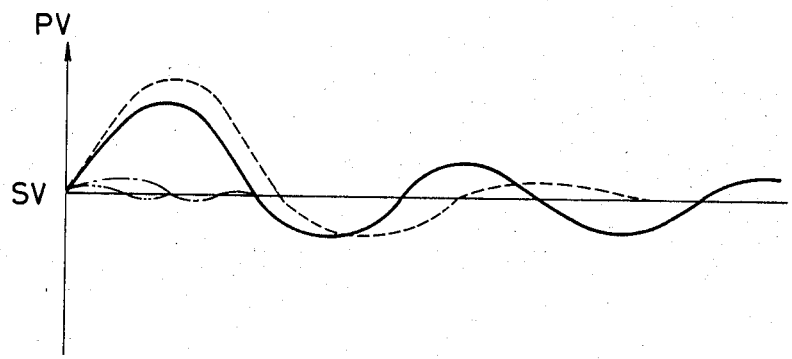
FIG. 3 is a waveform diagram for illustrating the action of the embodiment shown in FIG. 2.

FIG. 3 illustrates the variations in the process signal PV with respect to the set point variable SV in accordance with the state of combination of the control systems in the embodiment. The solid line corresponds to the case when there is the FB control alone, the dotted line shows the case when the gain scheduling is added to the FB control, the 1-dot chain line shows the case of adding the FF control to the case of dotted line, and the 2-dot chain line shows the case of the optimum adaptive control which corresponds to adding the FF control model gain correction to the case of 1-dot chain line.

First, using the case of the FB control alone which is shown in solid line, the operation of the process 42 and the FB control system will be described. If a disturbance, for example, a load decrease, is applied to the process 42, the process variable PV which is output from these increases. In response to this increase, an FB control output signal, which is PID computed at the FB control adjustment unit 48 based on the control deviation signal that is output from the deviation unit 46 to make the process variable PV to become equal to the set value SV, is output to the process 42 as a manipulated variable MV. Since, however, in this case of the PB control alone, the correction operation is applied directly in response to the variations in the process variable PV, it results in an excessive control in which the variations in the process variable persist, requiring a long time before the control becomes stabilized against the disturbance.

Then, there is added to the FB control a gain scheduling unit 52 to correct beforehand the gain of the process variable in accordance with the magnitude of the disturbance variations. The gain scheduling unit 52 relates the disturbance compensation signal D.K and the coupling coefficient which is set in accordance with the process variable to obtain a gain correction signal. With the gain correction signal thus obtained, the gain of the FB control output signal is sequentially corrected in the direction that corresponds to the load decrease to achieve an early stabilization of the control as shown by the dotted line.

However, the responsiveness to and controllability of such an FB control for the disturbance is not very effective, with resulting large variations in the process and a large energy loss, such that it becomes necessary to have an FF control in order to compensate for these influences beforehand. In the FF control, when a load decrease is detected by a disturbance detector 56, there is added to the FB control output signal a disturbance compensation signal D.K which is obtained by multiplying the disturbance signal with a set gain K for compensating the disturbance signal, improving the controllability markedly as shown by the 1-dot chain line.

For ordinary disturbances that are predictable, it is possible to realize an optimization of control by the combination of an FF control and an FB control with gain scheduling mechanism. However, such a combination suffers from the unpredictable disturbances such as the errors in the set gain due to the use over a long period or the ambient variations, and there arise some discrepancies in the set gain for the control model which leads to a deterioration in the FF control, thereby increasing the FB control output.

Because of this, an optimum control for unknown disturbances is executed by providing an FF control model gain adjustment unit 60 to realize an FF control which is responsive to the above errors and influence. The gain adjustment unit 60 corrects the gain of the FF control model through comparison of the FF control output signal and the manipulated variable MV in order to reduce to zero the FB control output signal in which these effects appear.

Next, an example of concrete construction of a process control apparatus shown in FIG. 2 will be described by referring to FIG. 4. In the concrete embodiment shown in FIG. 4, the same elements as in the simplified device illustrated in FIG. 2 will be assigned the same reference numerals without further explanation.

In this concrete embodiment, the FF control model gain adaptive unit 60 explained earlier comprises a gain adaptive unit 61 and an FF model gain adaptive mechanism 66. The gain adaptive unit 61 comprises an FF model gain correction unit 62 and the FF control model 58. The FF model gain correction unit 62 receives the disturbance compensation signal FFn which is the output signal of the FF control model 58 and the manipulated variable MVn which is the synthesized signal of the FB control output and the FF control output, computes a correction value for the FF control model that equalizes the above two signals, and outputs the correction value to the FF control model 58 to automatically correct its gain.

Furthermore, the FF control model 58 comprises a K memory 64 which stores the correction signal from the FF model gain correction unit 62, and an operator 65 which receives a signal from the K memory and a disturbance signal to compute and output a disturbance compensation signal FFn. The FF model gain correction unit 62 has a function which is represented by the following expression.

$$Kn - 1\left(1 + k\left(\frac{MVn}{FFn} - 1\right)\right).$$

In the above expression, $Kn-1$ represents the FF model gain at the previous sampling instant, MVn is the present manipulated quantity, FFn is the present FF quantity and k is the correction coefficient.

This expression permits one to select three correction modes by setting and changing the correction coefficient k.
(1) When $k=0$, $Kn=Kn-1$ where no correction of the gain is executed.
(2) When $k=1$, $$Kn = Kn - 1 \times \frac{MVn}{FFn} - 1\right)$$

where the correction of the FF model gain is executed in one operation.
(3) When $0<k<1$, $$Kn = Kn - -1\left(1 + k\left(\frac{MVn}{FFn} - 1\right)\right)$$

where the correction is executed in steps. Ordinarily, k is set to unity.

The FF model gain Kn from the FF model gain correction unit 62 is stored in the gain memory 64. Between the FF model gain correction unit 62 and the gain memory, and between a position-velocity converter 70 and the adder 54, there is provided an FF model gain adaptive mechanism 66. The FF model gain adaptive mechanism 66 includes timing switches 68 and 69 that are installed between the FF model gain correction unit 62 and the gain memory 64 and between the position-velocity converter 70 and the adder 54, respectively, a detection circuit 72 which detects that the difference between the FF control output FFn and the manipulated quantity MVn exceeds a prescribed value the continuation of a state, a process steady state detection circuit 74 which detects that the process is in a steady state (the change of distribution is small), and a control set state detection circuit 76 which detects that the control is in a steady state (the control deviation is small.) Hereinafter, the state in which these three states are achieved is called by a gain correction requiring state. When the gain correction requiring state is obtained, the adaptive mechanism 66 controls the supply of the FF model gain Kn to the gain memory 64, controls the additional synthesis of the FB control signal to the disturbance signal and controls the initialization of an incomplete differentiator. Here, by receiving simultaneously the detection signals from the detection circuit 72, the process steady state detection circuit 74, and the control steady state detection circuit 76, the timing switch 68 is opened and the incomplete differentiator 80 is initialized, whereas the timing switch 69 is closed.

Furthermore, in the control device with this concrete construction there is further provided a compensation circuit 78 which compensates for the dynamic characteristics. This compensation circuit 78 comprises an incomplete differentiator 80 which obtains the dynamic compensation component by receiving the FF control output FFn, a directivity table 82 which determines the direction of the dynamic compensation component from the incomplete differentiator 80 and functions as a dead band, and a synthesizer 86 which sums the signal from the directivity table 82 and the signal from a velocity signal to position-type signal converter 84.

In the FF model gain adaptaive mechanism 66 with the above construction, when the gain correction requiring state is obtained the timing switch 68 is opened and the other timing switch 69 is closed. Therefore, the FF model gain Kn from the FF model gain correction unit 62 at that point in time is renewed in the gain memory 64. However, the FF model gain Kn-1 which was stored at the previous sampling instant is multiplied by the disturbance D at the operator 65, and is input to adder 54 after it is converted to a position type signal by the velocity signal to position type signal converter 70.

Next, the operation of the process control apparatus shown in FIG. 4 will be described by referring to FIGS. 6a-j. In FIGS. 6a-j, the position type signals will be used to facilitate the understanding of the operation.

Here, the case in which the correction coefficient k in the FF model gain correction unit 62 equals unity, namely, the case in which the correction of the FF model gain is executed in one step, will be described.

When a disturbance as shown in FIG. 6a is varied, the FF control operates first to correct beforehand the influence of the disturbance variation on the process. The FF control multiplies the disturbance signal D with the FF model coefficient, as shown in FIG. 6g, which is set in the gain memory 64, and outputs a disturbance compensation signal DKn as shown in FIG. 6h to a position-velocity converter 70. The converter 70 finds the difference from the disturbance compensation signal DKn-1 for the preceding time, and outputs a velocity-type signal DKn (FIG. 6e) which corresponds to the variation in the disturbance compensation signal to the adder 54. At the adder 54, the velocity-type signal DKn and a velocity-type FB control output signal from the FB controler 48 are synthesized additively, and the resutling summed signal is converted to a position-type FF/FB control output signal by a velocity to position converter 84. Further, the disturbance compensation signal DKn is supplied also to a compensation circuit 78 for compensating the dynamic characteristics, and it is converted at an incomplete differentiator 80 of the compensation circuit 78 to a dynamic compensation signal En, as shown in FIG. 6f, for adjusting the lead/lag in the disturbance compensation signal DKn. The signal En is output throügh a directivity table 82 to an adder 86 where it is synthesized additively to the FF/FB signal from the velocity to position converter 84, to produce a manipulated quantity MV, as shown by FIG. 6c, to be output to the process 42.

Although the process 42 responds, under the action of the FF control, with the disturbance influence, such as the load variation, being compensated beforehand, there is detected an influence that cannot be compensated for completely even by the FF control as a process variable PV, as shown by FIG. 6b. At the deviation unit 46, the deviation of the process variable PV from the set quantity SV is computed, and the FB control adjustment unit 48 excutes a PID operation on the deviation with a prescribed gain to output the result to the multiplier 50 as a velocity-type FB control output. At the multiplier 50, the FB control output is multiplied by a gain correction signal Y that corresponds to the magnitude of the disturbance D that is sent from the gain scheduling unit 52, to have the gain of the FB control output corrected in advance, based on the disturbance information detected, and the corrected signal is output to the adder 54. The FB control is for correcting the deviation that cannot be estimated by the FF control, and the gain adjustment of the FB control corresponding to the disturbance variation is corrected forcibly by the gain scheduling, based on the information on the disturbance variation. Therefore, the variation in the control is small, as shown by the solid line in FIG. 8, and moreover, it is possible to realize an FB control with satisfactory responsiveness. When compared with the variation in the controlled quality for the case where there is no gain scheduling, it will be understood, without gain correction, that in the case where the disturbance is increased and the gain is insufficient (1-dot chain line of FIG. 8), the responsiveness deteriorates, though the stability of the control is maintained. In contrast, when the disturbance is decreased and the gain is excessive (dotted line of FIG. 8), the stability of the control fails.

In this way, it is possible to compensate for the deviations that persist even under the use of the FF control, by adopting an FB control with gain scheduling, to attain a control with satisfactory stability and responsiveness. However, there are some errors in the FF model coefficient of the FF control due to the variations in the environment and variables for the process over time, so that it will be seen, as shown by FIG. 6c, that there is a continuous output of a certain amount of FB control signal in spite of the fact that the control remains stable. Namely, when the difference between the FF control output DKn and the manipulated quantity MV exceeds a prescribed value, even while it is in a state in which the FF compensation is small and the control deviation is small, as shown by FIG. 6j, a condition judging unit 67 detects such a state and brings the timing switch 68 to a closed state and the timing switch 69 to an open state, and outputs a signal that initializes the incomplete differentiator. When the timing switch 68 is in a closed state, the FF model coefficient which has been computed continuously at the FF model gain correction unit 62, based on the FF model coefficient for the preceding time, the FF control output DKn, and the manipulated quantity MV, is output to the gain memory 64 and renewed as shown by FIG. 6h. Due to variations in the FF model coefficient value, there are variations as shown by FIG. 6b in the disturbance compensation signal DKn (the FF control output). As a result, a velocity-type signal is output from the position to velocity converter 70 corresponding to the quantity of variation. However, this signal will not be outputted to the adder 54, as shown by the dotted line in FIG. 6e, since the timing switch 69 is in an open state. Therefore, there will be no effect on the manipulated variable by FF output of the FF model correction that has nothing to do with the disturbance variations.

In addition, when the disturbance compensation signal DK is corrected and is made equal to the value for the manipulated quantity MV by the FF model correction, the condition judging unit 67 outputs a signal which reinstates the timing switches 68 and 69 to steady states. Here, it should be noted that the signal is output with some time delay.

When the FF model is thus corrected, an FF control will be executed based on the correction coefficient at the time of the next variation in the disturbance. By this, it becomes possible to nullify the FB control at the time of stable control, as shown by FIG. 6g, realizing an optimum FF control.

Next, a description will be given for the case when the correction coefficient k of the FF model gain correction unit 62 is changed to 0.2, by referring to FIGS. 7a–j. Here, the operations that are the same as for FIGS. 6a–j will be omitted.

When the correction coefficient k is chosen to be less than unity, the correction is executed stepwise by finely adjusting the FF model coefficient using the degree of contribution corresponding to the component obtained by multiplication with this value of k.

The reason for this is that when the correction is carried out by using the FF model correction as is, as output from the FF model gain correction unit 62 with k=1, it is possible to correct the FF model coefficient quickly, but there remains a possibility of detecting the influence due to some variations and the like in the manipulated quantity MV as the MV value for that time. The stepwise fine correction is aimed at handling variations with the passage in time of these kinds. In this case, it is appropriate to set the thresholds for the deviation of the sensing circuit 72, the process steady state sensing circuit 74, and the control steady state sensing circuit 76, of the FF model gain adaptive mechanism 66 to minute values that are desired.

In its operation, based on the fulfillment of the conditions for each sensing signal, the condition judging unit 67 operates to close the timing switch 68 and open the timing switch 69. Then, a finely corrected quantity computed in proportion to the value of K, at the FF model gain correction unit 62, based on the difference between the FF control output DK and the manipulated quantity MV, is output to the gain memory 64 as shown in FIG. 7h, and the FF control output DK varies by the finely corrected component as shown by FIG. 7d. The variation in the FF control output DK which is output from the position to velocity converter 70, is compensated for by the timing switch 69. The finely corrected FF control output DK is input to the FF model gain correction unit 62 where it is compared with the manipulated quantity for that point in time, and a finely corrected quantity based on their difference is output to the gain memory 64. In a similar manner, the FF model coefficient is corrected stepwise until the FF control output DK becomes equal to the manipulated quantity MV.

Next, referring to FIGS. 5 and 9, another concrete embodiment of the process control device shown in FIG. 2 will be described. Here, in the concrete embodiment shown in FIG. 5, those elements that are the same as in the simplified device shown FIG. 2 will be given the same reference numerals and their explanation will be omitted.

Figure 5:
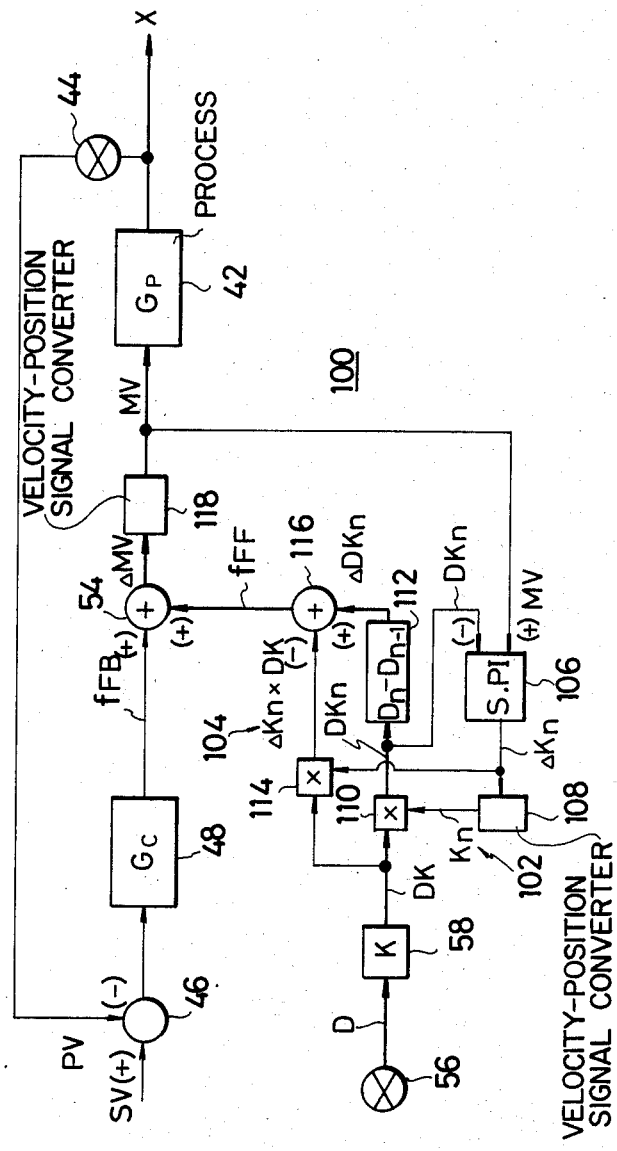
FIG. 5 is another concrete block diagram of the process control apparatus shown in FIG. 2.
Figure 8:
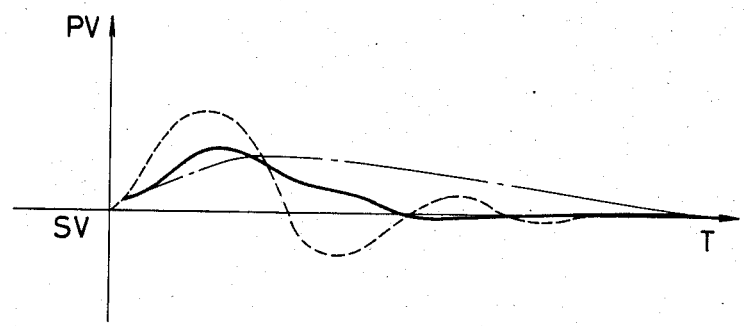
FIG. 8 is a time chart illustrating the variations in the control quantity for the cases with and without the gain scheduling.

As shown in FIG. 5, the process control device 100 corresponds to the case in which the coefficient C of the gain scheduling unit 52 shown in FIG. 2 that is used for the nonmixing process or the like, is zero, that is, the case where there is no gain scheduling function.

In this concrete embodiment, the FF model gain adaptive unit 60 shown in FIG. 2 includes a disturbance compensation signal correction system 102 and a correction influence compensation system 104.

The disturbance compensation signal correction system 102 is for correcting the disturbance compensation signal $DK=(D\times K)$ to be equal to the manipulated variable MV that is output to the process 42, and the correction influence compensation system 104 is to compensate a disturbance compensation signal (called hereafter as a corrected disturbance compensation signal) DKn which is corrected by the disturbance compensation signal correction system 102 to have no influence of correction. That is, these two systems 102 and 104 execute, based on the correction signal from a sample value control unit 106, an automatic correction and a compensation operation of the disturbance compensation signal DK minimize the degree of contribution of the FB control to the FF/FB control by setting the manipulated variable MV and the corrected disturbance compensation signal DKn equal. The sample value control unit 106 executes a sample value control such as a P operation, a PI control, or the like, and outputs the deviation between the manipulated variable MV and the corrected disturbance compensation signal $DKn(=DK\times Kn)$ or an adjusted value for correcting the deviation, as a correction signal $\Delta Kn$. In this embodiment, description will be given by assuming that the correction signal is of a velocity type signal and is a deviation signal due to the P operation.

The velocity type correction signal $\Delta Kn$ is supplied to the disturbance compensation signal correction system 102 and the correction influence compensation system 104. After converting the correction signal $\Delta Kn$ to a position type signal Kn by a velocity type signal to position type signal converter 108, the disturbance compensation signal correction system 102 multiplies the position type signal Kn by the disturbance compensation signal DK by means of a multiplier 110, to carry out an automatic correction of the disturbance compensation signal DK. The corrected disturbance compensation signal DKn thus obtained is fed back as a feedback signal to the sample value control unit 106 and is supplied as well to a position type signal to velocity type signal converter 112 to be converted to a velocity type signal $\Delta Kn$. The correction influence compensation system 104 multiplies the velocity type correction signal $\Delta Kn$ with the position-type disturbance compensation signal DK at a multiplier 114 to obtain a velocity-type influence compensation signal $\Delta Kn \times DK$ which is output to a compensator 116. At the compensator 116 the influence on the manipulated variable MV due to the correction operation by the disturbance compensation signal correction system 102 is compensated for by subtracting the influence compensation signal $\Delta Kn \times DK$ from the velocity-type corrected disturbance compensation signal $\Delta DKn$.

Namely, in the automatic correction and its function as a compensation operation for the disturbance compensation signal DK, which is the characteristic aspect of the embodiment, the sample value control unit 112 obtains, periodically or as the need arises, the manipulated variable MV and the deviation from the corrected disturbance compensation signal DKn, as a velocity-type correction signal $\Delta Kn$ that represents the quantity of variation. The disturbance compensation signal correction system 102 multiplies the disturbance compensation signal DK by the position-type value Kn which is obtained by accumulating the position-type correction signal ΔKn. In addition, the correction influence compensation system 104 multiplies the correction signal ΔKn by the disturbance compensation signal DK, to obtain the correction compensation DK×ΔKn of the disturbance compensation signal for the variation component corresponding to the present sampling instant. The correction component is removed from the corrected disturbance compensation signal $DKn = DK \times Kn = DK \times (\Delta Kn + Kn - 1)$ to compensate for the irregularity due to the present correction component in the FF control output. Furthermore, based on the value of the position-type correction signal, the correction influence compensation system 104 corrects the FB control output to bring it to zero or less than a prescribed value, and outputs the result to the adder 54 as an FF control output $f_{FF}$.

Next, the operation of the present embodiment will be described by referring to FIGS. 9a–k. FIGS. 9a–k are the time charts that illustrate the variations of each signal in response to the process variations and the disturbance. In this embodiment, the automatic correction and the compensation operation of the disturbance compensation signal DK are arranged to be carried out in correspondence with the sampling period of the sample value control unit 106, where the sampling period can be set freely in accordance with the responsiveness of the process. Here, description will be given by assuming an initial state of the process in which the disturbance signal DK is in a stationary level $i_o$ and the manipulated variable MV is increased from the component of the adjusted quantity ($\alpha\%$). Furthermore, the variation quantity of the disturbance signal DK and the variation quantity of the process variable are assumed to be $\alpha\%$ to facilitate the explanation. However, needless to say, the present embodiment will operate as well for any variation quantity whatsoever.

First, the automatic correction and compensation operation of a first round will be described. The first round operation will be executed for the process in the initial state, namely, for the case in which the process variable varies at $\alpha\%$ in response to the prescribed value. The sample value control unit 106 carries out a P operation by taking the manipulated variable $MV(=i_o \times (1+\alpha))$ as a set value and the corrected disturbance compensation signal $DKn(=i_o)$ as a feedback signal, to bring these values to coincidence, and outputs their deviation as a velocity-type correction signal $\Delta Kn(=K \times \alpha)$. The correction signal ΔKn is converted to a position-type signal $Kn[=Kx(1+\alpha)]$ which represents the result of accumulation of the velocity-type correction signal ΔKn, by the velocity-type signal to position-type signal converter 108 in the disturbance compensation signal correction system 102, and the signal Kn is multiplied with the disturbance compensation signal $DK(=i_o)$ at the multiplier 110. After the disturbance compensation signal DK is automatically corrected and taken out as a corrected disturbance compensation signal $DKn(=i_o \times K(1+\alpha))$, it is converted to a velocity-type signal $\Delta DKn(=i_o \times K\alpha)$ in the position-type signal to velocity-type signal converter 110.

Furthermore, the correction signal $\Delta Kn(=K\alpha)$ is multiplied with the disturbance compensation signal DK by the multiplier 114 in the correction influence compensation system 104, and is output as a velocity-type influence compensation signal $\Delta Kn \times DK(=i_o \times \alpha)$ to the compensator 116 where it is subtracted from the velocity-type signal DKn. The output thus obtained is output to the adder 54 as a velocity-type FF control signal $f_{FF}(=\Delta DKn - \Delta Kn \times DK = 0)$ and is summed with the velocity-type FB control signal $f_{FB}(=0)$ in the adder, to be output as a velocity-type manipulated variable $\Delta MV(F_{EF}+f_{FB}=0)$. The manipulated variable ΔMV is converted to a position-type manipulated variable MV by the velocity-type signal to position-type signal converter 118 and is output to the process 42. (MV=0)

In this manner, in the first round operation, the correction signal ΔKn for the controlled sample value which makes the FB control output zero is maintained by converting it to a position-type signal at the disturbance compensation signal correction system 102. As a result, the position-type signal DKn is equal in value to the position-type manipulated variable MV. Further, it is compensated at the correction influence compensation system 104 as a variation component of the controlled sample value with respect to the preceeding sample value (the present variation quantity for the first round operation), so that the disturbance compensation signal DK is output as the FF control output (the variation quantity of the disturbance compensation signal DK for the FF control output is zero as it is a velocity-type signal).

Figure 9:
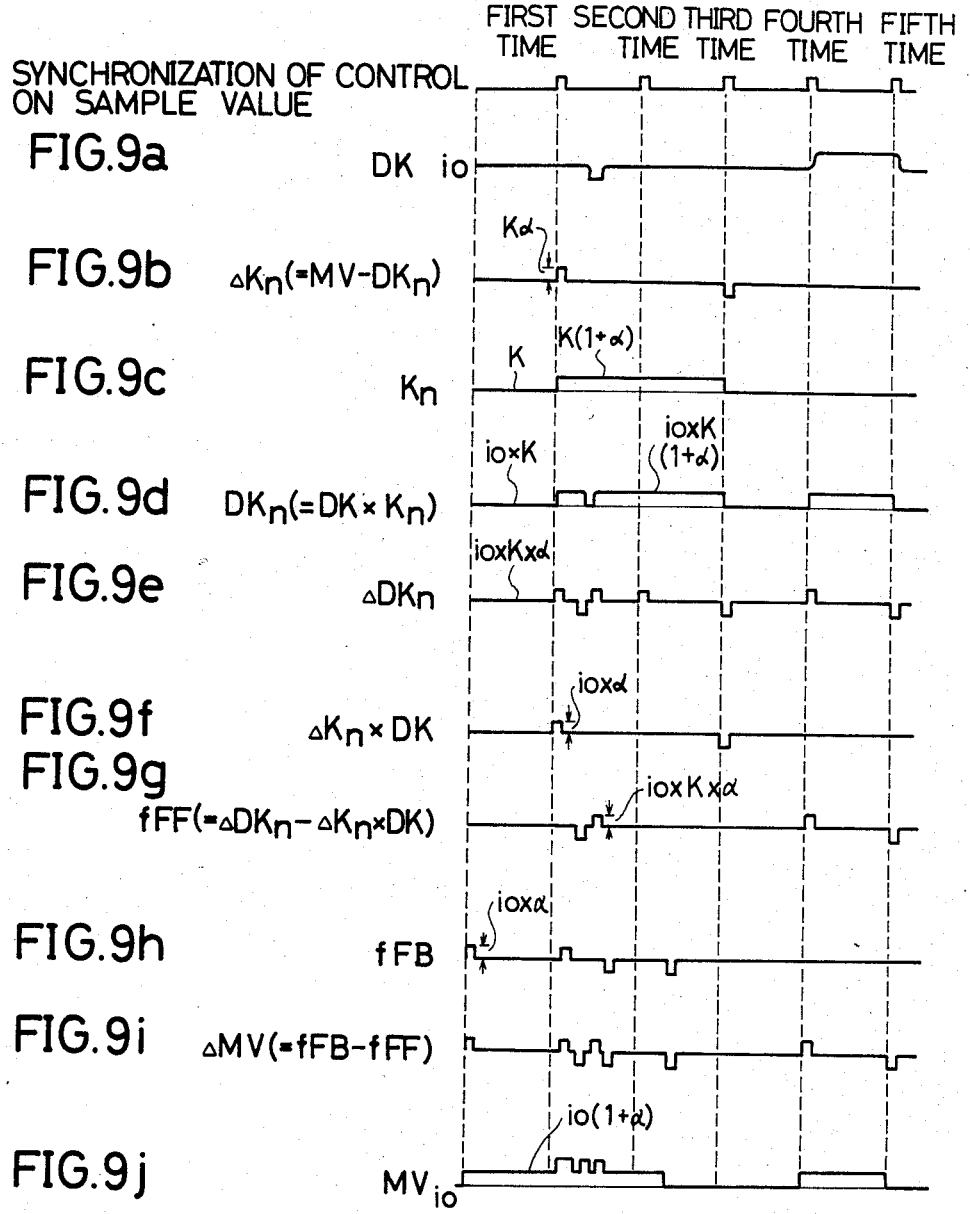
FIGS. 9a–9j are time charts for illustrating the operation of the embodiment shown in FIG. 5.

When the process variable or the disturbance signal changes during the period after completion of such an automatic correction and compensation operation and before the control for the next sample value, an ordinary FB control signal $f_{FB}$ and an FF control signal $f_{FF}$ to control such a change are output, as shown by FIG. 9. Due to this control, the manipulated variable MV which was equal to the corrected disturbance compensation signal in the first round of sample control changes also. That is, although the corrected disturbance compensation signal DKn varies in response to the changes in the disturbance signal alone, the manipulated variable MV varies under the influence of changes in the process variable, namely, the changes in the FB control signal, in addition to the changes in the disturbance signal. Therefore, it is possible to reduce the degree of contribution of the FB control in the FF/FB control, since the influence of the FB control signal can be dissolved by carrying out an automatic correction so as to have the corrected disturbance compensation signal DKn equal to the manipulated variable MV.

During the third period of sample value control, the manipulated variable does not remain equal to the corrected disturbance compensation signal $DKn(=i_o \times (-1+\alpha))$ due to the variation (from $i_o \times (1+\alpha)$ to $i_o$) of the change in the process variable outside of the period of the sample value control. Then, with the start of synchronization of the control, the manipulated variable MV and the corrected disturbance compensation signal DKn (the signal prior to the automatic correction by the present sample control, that is, the value obtained by multiplying the disturbance compensation signal at the start of the present sample control with the position-type correction signal for the previous sampling) at that time undergo a P operation at the sample value control unit 106, and their deviation is output as a velocity-type correction signal $\Delta Kn(=-\alpha)$. The correction signal ΔKn is multiplied by a position-type correction signal Kn which is being held in the converter 108 of the disturbance compensation signal correction system 102, and the resulting correction signal Kn changes from K(1−α) to K and the disturbance compensation signal DK is automatically corrected hereafter by this changed correction signal. The corrected disturbance compensation signal DKn is corrected by this automatic correction to the value that is euqal to the manipulated variable MV, as shown in FIG. 9a-j.

Moreover, the correction signal ΔKn is multiplied by the disturbance compensation signal DK at the correction influence compensation system 104, and the resulting influence compensation signal ΔKn×DK(=−i+2) removes the FF control signal which was generated by the automatic correction independently of the variations in the disturbance to compensate for the irregularity in the control system due to automatic correction.

Next, during the fourth and the fifth periods of sample value control, the FF control has zero output and is in a state of variation of the disturbance compensation signal DK in which an ordinary FF control is carried out. That is, the FF control signal $f_{FF}$ which is output is a variation component of the disturbance compensation signal.

In this way, in the present embodiment, automatic correction is carried out using the controlled sample value so as to have the manipulated variable MV and the disturbance compensation signal equal. Therefore, it is possible to reduce markedly the degree of contribution of the FB control to the FF/FB control by compensating for the variation component in the sample-controlled value that is generated by the automatic correction and is not directly affected by the disturbance variations.

Furthermore, although a description for an embodiment was given using an example in which the sample value control unit 106 outputs the deviation between the corrected disturbance compensation signal DKn and the manipulated variable MV as a velocity-type signal, the sample value control unit 106 may have a construction which outputs the deviation as a position-type signal.

Figure 10:
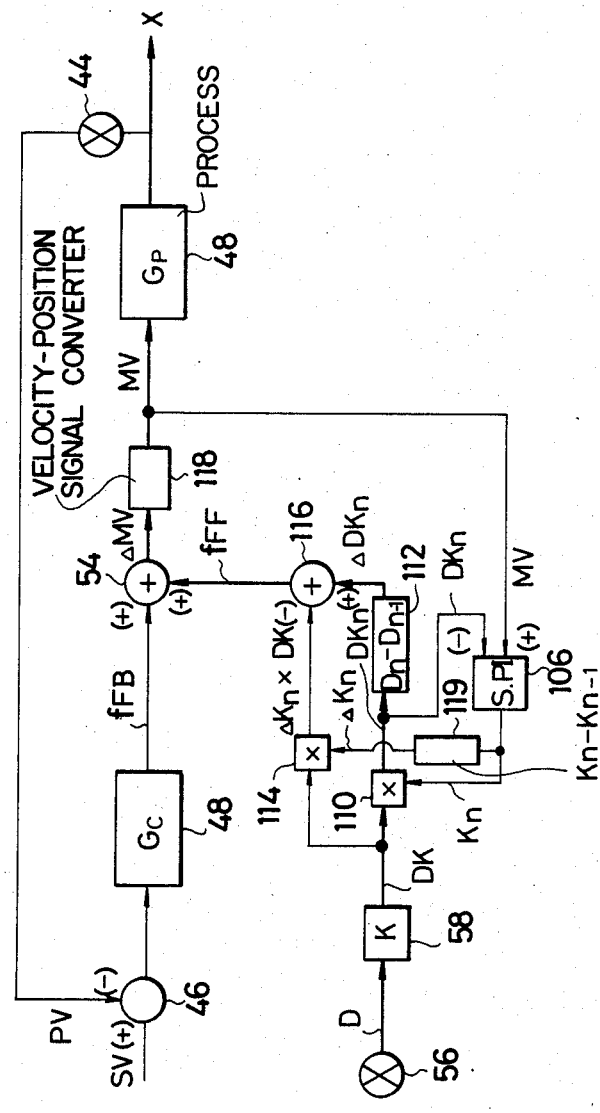
FIG. 10 is a modification to the process control apparatus shown in FIG. 5.

For example, as shown in FIG. 10 a construction may be considered in which the disturbance compensation signal correction system 102 includes a multiplier 110, and the correction influence compensation system 104 has a construction where a position-type to velocity-type converter 119 which converts a position-type correction signal to a velocity-type signal is added to the present embodiment. In this construction, the disturbance compensation signal correction system 102 multiplies the position-type correction signal Kn which is output from the sample-controller unit 106 by the disturbance compensation signal DK at the multiplier 110 to carry out an automatic control. Also, the correction influence compensation system 104 converts the position-type correction signal Kn to a velocity-type signal at the converter 119. The variation component ΔKn from the previously controlled sample value is multiplied at the multiplier 114 by the disturbance compensation signal DK to obtain an influence compensation signal. The influence compensation signal compensates for the correction.

Furthermore, in the above embodiment, the automatic correction mechanism of the disturbance compensation signal and the function of compensating for the influence due to the correction have been described using a hardware construction which is capable of accomplishing these functions. In the present invention, however, these functions may also be alternatively attained by means of computer software.

Figure 11:
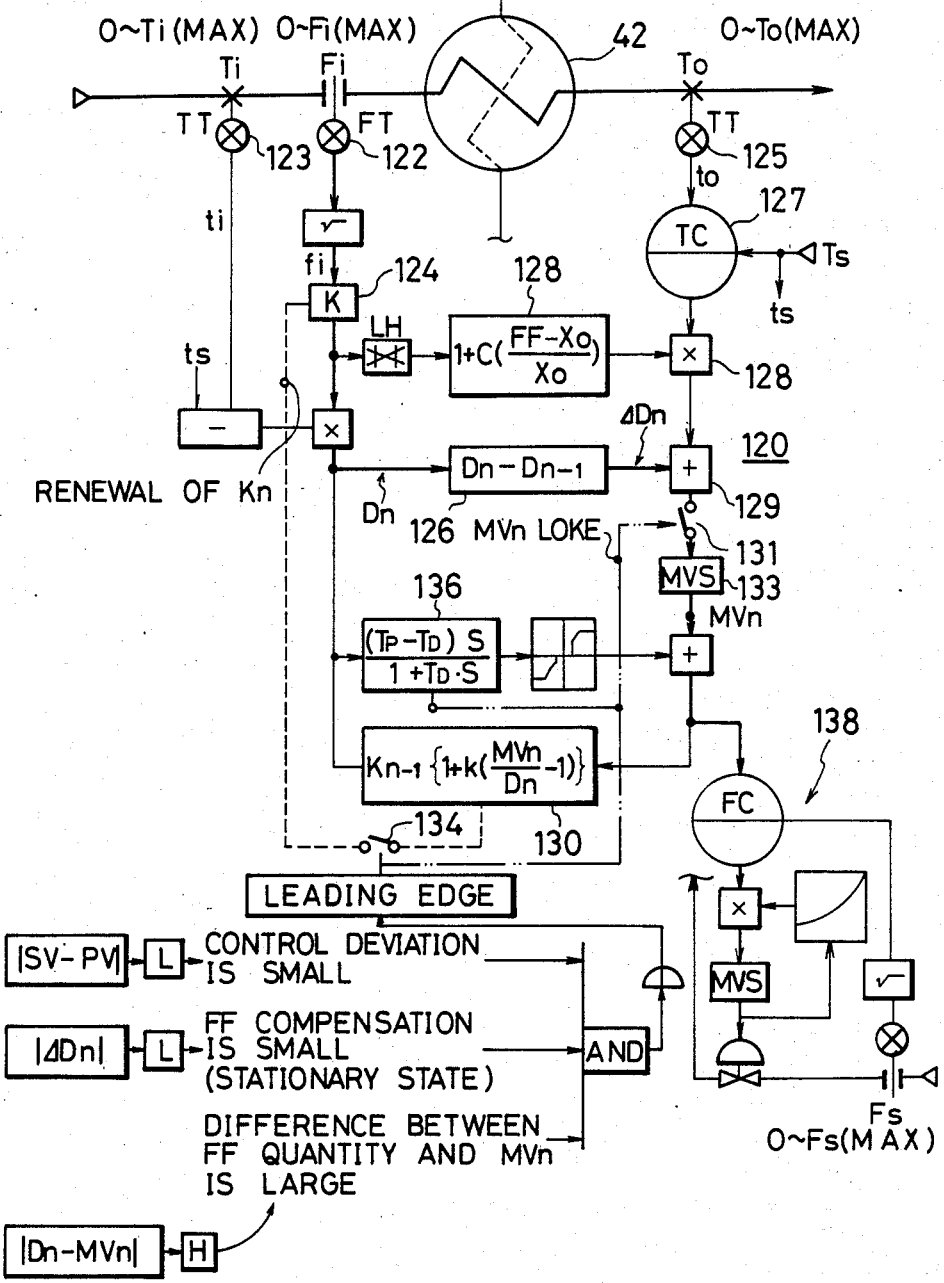
FIG. 11 is a block diagram illustrating an example of applying the process control apparatus in accordance with the present invention to the control on the temperature at the outlet of a heat exchanger.

Next, referring to FIG. 11, an example of the process control apparatus in accordance with the present invention as it applies to the temperature control at the outlet of a heat exchanger will be described.

The temperature control apparatus at the outlet of a heat exchanger 120 controls the temperature to at the outlet of the heat exchanger 42 to a set temperature To. The temperature To at the outlet of the heat exchanger is detected by a detector 125, and a controller 127 executes a control and adjustment operation based on the detected temperature and the set temperature Ts, outputting the result as a velocity-type FB control output signal. The FB control output signal is output through a multiplier 128, an adder 129, and a timing switch 131 to a velocity-type signal to position-type signal converter 133 where it is converted to a position-type manipulated variable. This position-type signal, after being summed with the dynamic compensation component, is output to a valve characteristic compensation unit 138 to adjust the flow rate of the thermal fuel supplied to the heat exchanger. Further, the disturbance detectors 122 and 123 detect the disturbances in the flow rate and the temperature of the raw material sent in as Fi and Ti, respectively. The disturbance signal D is multiplied by the static compensation coefficient K by the FF control model 124 to be converted to a disturbance compensation signal. The disturbance compensation signal is converted to a velocity-type signal by the position-type signal to velocity-type signal converter 126, added to the FB control output signal at the adder 129, and sent to the value characteristic compensation unit 138 as a control output signal in which the disturbance is compensated for. At the same time, the disturbance compensation signal is sent to the gain scheduling unit 128 whose output is supplied to the multiplier to have the gain of the FB control output signal corrected. The compensation coefficient K is computed by the FF model correction unit 130 to give a compensation quantity which equalizes the position-type manipulated variable and the disturbance compensation signal, and is removed when the switch 134 of the FF model gain adaptive mechanism 132 is closed based on the fulfillment of a prescribed driving condition. the compensation coefficient K is determined by the following equation.

$$K = \frac{P \times Ci}{\eta \times Hs} \times \frac{Fi(\text{MAX})}{Fs(\text{MAX})} \times To\ (\text{MAX})$$

Here, P is the specific gravity of the raw material, Ci is the specific heat of the raw material, η is the heat exchange rate, and Hs is the latent heat of the steam. The disturbance compensation signal is sent further to the dynamic compensation circuit 136 where it is added to the manipulated quantity MVn as a dynamic compensation signal. the output signal is supplied to the FF model correction unit 130 as the position-type manipulated signal. The manipulated quantity MVn thus compensated for the dynamic characteristic is sent to the value characteristic compensation unit 138 to control the value which supplies the steam to the heat exchanger.

As described above, by combining an FB control with its gain scheduling, an FF conrol, and the automatic correction function for its control model gain, the following advantages can be attained.

(1) It is possible to improve the responsiveness to any variations of the process disturbance whatsoever, and also to enhance the controllability of the process.

For instance, in a flow control, it is possible to promptly respond to changes in the process dynamic characteristics due to sudden changes in the disturbance, and in a temperature control, even when there are long-term variations in the ambient temperature, such as the day-night and the seasonal changes, it becomes possible to optimize the control, so that in either case it is possible to restrain the variations in the process variable to a minimum.

With such a device it then becomes possible to attain a marked improvement in the quality of products, a reduction in energy consumption, and conservation of natural resources.

(2) Using a sample construction which does not require a difficult mathematical theory, it is possible to apply the device multipurposely to any process in order to respond to a flexible production.

(3) Without requiring complicated an extra search signals, it is possible to eliminate shocks to the operation terminals and other parts, to thereby improve the process reliability markedly.

Although a description was given in the above embodiment in terms of the examples of the hardware which can realize each function of an FB control, an FF control, a gain scheduling, and an FF model gain adaptation, it is possible in the present invention to accomplish these functions by means of computer software.

Furthermore, processing of the operation for each function may be accomplished in terms of either a position-type signal or a combination of a position-type signal and a velocity-type signal.

Moreover, in an embodiment, the gain scheduling unit was calculated on the disturbance compensation signal D.K. However, a similar effect can also be obtained even if the disturbance compensation signal D.K is replaced by the disturbance signal D. Needless to say, various modifications will be possible in this manner without deviating from the scope of the present invention.

In summary, in accordance with the present invention, it is possible to restrain the variations in the process variable to a minimum for any disturbance, and to attain an optimum adaptive control by improving the controllability. In addition, it is possible to provide a process control device which is simple and can easily be put into multipurpose use.

Various modifications will become possible for those skilled in the art after receiving the teachings of the present disclosure without departing from the scope thereof.

What is claimed is:

1. A process control apparatus which is adapted optimally to a disturbance, comprising:
    feedback control means for outputting a feedback control signal that is computed by comparing and adjusting a set value and a process variable;
    feedforward control means, responsive to a disturbance signal, for outputting disturbance compensation signal based upon a feedforward control model having a gain;
    gain scheduling means for correcting a gain of the feedback control signal from said feedback control means in response to the magnitude of variations in the disturbance compensation signal from said feedforward control means;
    means for adding the feedback control signal that has been gain corrected by said gain scheduling means and the disturbance compensation signal from said feedforward control means to obtain a manipulated variable; and
    feedforward control model gain adaptive means for outputting a correction signal to said feedforward control model, said correction signal being computed by comparing and equalizing the manipulated variable with the disturbance compensation signal.

2. A process control apparatus as claimed in claim 1, wherein said feedforward control model gain adaptive means adjusts the gain of the feedforward control moedl and reduces the feedback control signal of the feedback control means to zero when there is a change in the disturbance.

3. A process control apparatus as claimed in claim 2, wherein said gain scheduling means comprises a gain scheduling unit with the following gain correction signal Y:

$$Y = 1 + C\left(\frac{FF - Xo}{Xo}\right),$$

where FF is the input signal to the gain scheduling unit, namely, the disturbance compensation signal, C is the coupling coefficient between the feedforward control and the feedback control, and Xo is the magnitude of the disturbance compensation signal at the time when a PID (proportional, integral, derivative) parameter of the feedback control adjustment unit is determined.

4. A process control apparatus as claimed in claim 1, wherein said gain scheduling means corrects the gain of the feedback control signal by multiplying the feedback control signal with a gain correction signal which is computed by relating the magnitude of the disturbance to a coupling coefficient that is set based on the process variable.

5. A process control apparatus as claimed in claim 1, wherein said feedforward control model gain adaptive means corrects periodically the gain of the feedforward control model.

6. A process control apparatus as claimed in claim 1, wherein said feedforward control model gain adaptive means determines the magnitude of the gain of one of the feedback control signal and the manipulated variable to correct the gain of the feedforward control model when the gain of one of the feedback control signal and the manipulated variable exceeds a predetermined level.

7. A process control apparatus as claimed in claim 6, wherein said feedforward control model gain adaptive means comprises a feedforward model gain correction unit with the following function:

$$K_{n-1}\left[1 + k\left(\frac{MVn}{FFn} - 1\right)\right],$$

where, n is the sampling instant, $K_{n-1}$ is the feedforward model gain for the preceding n, MVn is the manipulated quantity for the present n, FFn is the disturbance compensation signal for the present n, and k is a correction coefficient.

8. A process control apparatus as claimed in claim 7, wherein the correction coefficient k in the feedforward model gain correction unit is equal to unity.

9. A process control apparatus as claimed in claim 7, wherein the correction coefficient k in the feedforward model gain correction unit satisfies 0<k<1.

10. A process control apparatus as claimed in claim 6, wherein said feedforward control model gain adaptive means comprises a sample value control unit for generating the correction signal, a disturbance compensation signal correction system which carries out correction by making the disturbance compensation signal equal to the manipulated variable, and a correction influence compensation system for compensating the corrected disturbance compensation signal whereby the degree of contribution of the feedback control in the feedforward-/feedback control based on the correction signal from the sample value control unit is minimized.

11. A process control apparatus as claimed in claim 10, wherein the disturbance compensation signal correction system comprises a first multiplier for generating a corrected disturbance compensation signal by multiplying the correction signal by the disturbance compensation signal, and the correction influence compensation system comprises a second multiplier for generating an influence compensation signal by multiplying the disturbance compensation signal by the correction signal, and a compensator for subtracting the influence compensation signal from the corrected disturbance compensation signal.

12. A process control apparatus as claimed in claim 1, wherein the feedforward control model comprises a gain memory for storing the correction signal from said feedforward control model gain adaptive means, and an operational means for receiving both the correction signal from the gain memory and the disturbance signal to compute and output the disturbance compensation signal.

13. A process control apparatus as claimed in claim 12, further comprising:
a feedforward model gain adaptive mechanism for detecting steady states of the process and the control apparatus and detecting when the difference between the disturbance compensation signal and the manipulated quantity exceeds a predetermined value, to control the supply of the correction signal to the gain memory, as well as to control the addition of the disturbance compensation signal and the feedback control signal.

14. A process control apparatus as claimed in claim 13, further comprising:
a dynamic characteristic compensation circuit responsive to the disturbance compensation signal and the manipulated variable for generating a dynamic characteristic compensation signal in order to compensate for a dynamic characteristic of the disturbance.

15. In a process control apparatus having a feedback control loop including a process as a control object, multiplier means for multiplying the feedback control output signal by a gain correction factor, and an adder for adding the gain-corrected feedback control signal and a disturbance compensation signal from a feedforward control loop to generate a manipulated value, said feedforward control loop comprising:
a disturbance detector for detecting any disturbance to the process;
a gain adaptive unit, responsive to the manipulated variable and the disturbance compensation signal, for producing a correction signal; and
a feedforward control model for producing the disturbance compensation signal in response to a disturbance signal from said disturbance detector and the correction signal so as to automatically correct the gain of the control model; and
a gain scheduling means, responsive to the disturbance compensation signal, for correcting the gain of the feedback control output signal in accordance with the magnitude of the change in disturbance, whereby the disturbance compensation signal being applied to said adder keeps variations in the process variable to a minimum for any disturbance while attaining an optimum adaptive control.

16. The process control apparatus as claimed in claim 15, wherein the gain correction in the gain scheduling means is carried out in accordance with the following equation:

$$Y = 1 + C\left(\frac{FF - X_o}{X_o}\right), (0 < C < 1)$$

where
c = a coupling coefficient between the feedforward and feedback control loops
FF = the disturbance compensation signal
$X_o$ = magnitude of the disturbance compensation signal at the time when a PID (proportional, integral, derivative) parameter adjustment of the feedback control loop is determined.

17. The process control apparatus as claimed in claim 15, wherein the gain correction of the feedforward control model is carried out in accordance with the following equation;

$$Y = K_{n-1}\left[1 + k\left(\frac{MV_n}{FF_n} - 1\right)\right],$$

where
n = the sampling instant,
$K_{n}-1$ = feedforward model gain for the preceding n,
$MV_n$ = the manipulated variable for the present n,
$FF_n$ = the disturbance compensation signal for the present n,
k = a correction coefficient.

* * * * *